INVENTORS.
LESTER D. EDINGER
CHARLES A. HARVEY
BY
ATTORNEY

INVENTORS.
LESTER D. EDINGER
CHARLES A. HARVEY
BY
ATTORNEY

United States Patent Office 3,132,828
Patented May 12, 1964

3,132,828
DIRIGIBLE CRAFT CONTROL APPARATUS
AND METHOD
Lester D. Edinger, White Bear Lake, and Charles A. Harvey, Minneapolis, Minn., assignors to Minneapolis-Honeywell Regulator Company, Minneapolis, Minn., a corporation of Delaware
Filed Dec. 26, 1962, Ser. No. 247,201
12 Claims. (Cl. 244—77)

This invention relates to control apparatus for a dirigible craft of the aerolastic type or similar body while traveling in a linear path and subject to movements about an axis of the craft at an angle to said path of travel. For purposes of illustration only, the invention is herein shown in connection with control apparatus such as an automatic pilot that is connected to operate the control surface of an aircraft to control the movement of the craft about an axis thereof while in linear flight. This invention relating to control of aerolastic type craft is similar to the control apparatus in United States patent application of Falkner, Hendrick and Lee, Serial No. 55,916, filed September 14, 1960, now Patent No. 3,079,108.

As stated in the aforementioned Falkner et al. application, an aerolastic craft is subject to external transient disturbing forces while in linear flight which forces affect the craft's motion such as the angular rate of the craft, for example, about an axis at an angle to the direction of craft movement while in linear flight. An aircraft of the aerolastic type is thus subject to body bending action when subject to an external condition causing craft angular rate about the axis. Thus a condition sensor such as a rate gyroscope on the craft is affected not only by the rigid body motion of the craft about its axis involved but also by the internal body bending action of the craft.

The prior Falkner et al. application was concerned solely with the isolation of the first body bending mode of the craft. The present invention relates to a method and apparatus for controlling the amplitudes and normal accelerations of a plurality of body bending or elastic modes of a flexible type dirigible craft.

A further object of this invention is to isolate the effect of selected body bending modes from the craft rigid body motion in an aerolastic craft.

A further object of this invention is to define methods and apparatus capable of controlling a dirigible craft about an axis thereof and responsive to the rigid body motion but also that due to a multiple number of selected body bending modes as well.

A further object of the invention is to define a method and apparatus capable of controlling a craft rigid body motion about an axis and also isolating a multiple number of craft axis bending modes as well to separately obtain their effects.

The above and other objects of the invention will be apparent from the following description when read in connection with the accompanying drawings, wherein.

Figure 1:
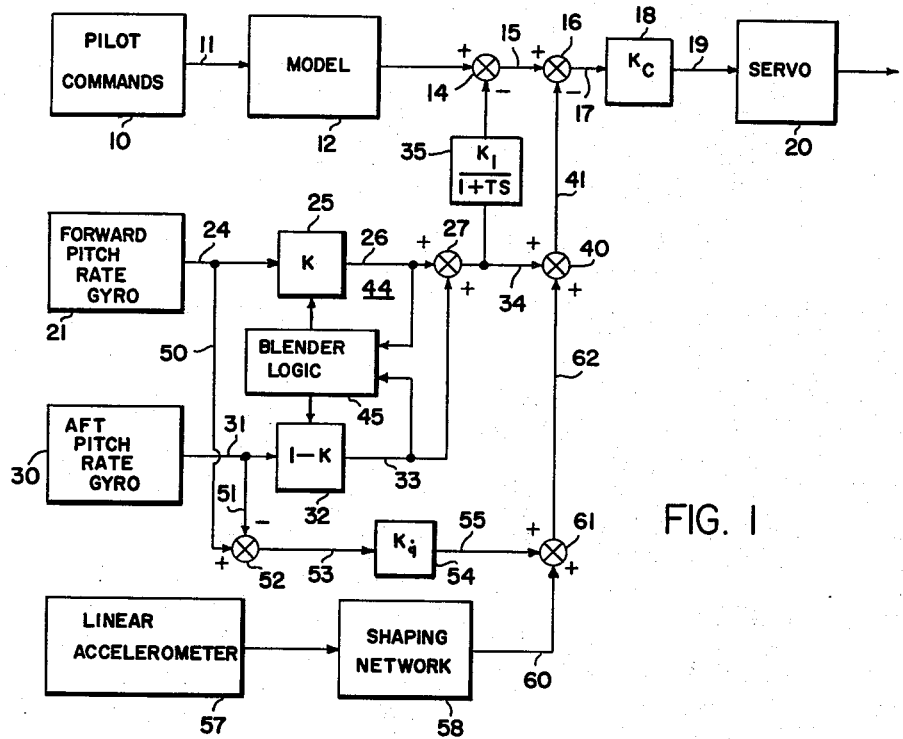
FIGURE 1 is a known type of adaptive control system for a craft including provisions for controlling separately one bending mode thereof.

Satisfactory bending mode control of a flexible aircraft may be achieved by the use of a single attitude rate sensor and a linear accelerometer if they can be placed in a suitable location. The constraint on the sensor location is that all the bending modes' slopes and the normalized displacements be of the same sign.

In using this approach, however, the rigid body response of the aircraft may be compromised somewhat to achieve proper bending mode control. The reason for this is that the single sensor signals cannot be separated into (1) those proportional to rigid body motion and (2) those proportional to flexural motions in order to allow independent optimum control of each.

Improved control of the bending mode amplitudes and accelerations can be achieved by the utilization of pure bending rate and/or acceleration feedback signals. Through the use of multiple sensing devices, it is possible to separate (a) each individual bending signal from the rigid body motion signal and (b) from the other bending signals. This technique also relieves the stringent requirements for sensor location when but one sensor is used.

A suitable body bending mode rate signal at the characteristic mode frequency will augment the damping of the bending mode resulting in a reduction of the bending mode amplitudes and accelerations.

The invention relates to methods and apparatus for controlling amplitudes and normal accelerations of the elastic modes of a flexible dirigible craft and also the rigid body motion of the craft. In the present invention a method is provided for uncoupling the motion of the craft due to the body bending modes from the motion due to the rigid body itself and providing apparatus to independently provide "artificial stiffening" of the flexible craft and regulation of its rigid body motion. To provide such novel "artificial stiffening," or positive control, of body bending of a vehicle and to provide a significant increase in the control of body bending along with an increased latitude of selection in positioning of sensors, the novel method herein utilizes a multiple number of sensors and sensors blending techniques.

Use of multiple sensors, above that used in the aforesaid Falkner et al. application, provides the control system with sufficient intelligence to control not only the rigid body motion of the craft but each significant bending mode of the craft as well.

In illustration of the invention, the use of multiple attitude rate sensors integrated by sensor blending techniques together with linear acceleration to provide gust alleviation and positive control of the blending modes has been utilized.

The invention has been shown as applied to an "adaptive aircraft control apparatus" of the type illustrated in the aforesaid Falkner et al. application which apparatus utilizes the output of a model to represent a desired response of the aircraft to an input signal to the model and the apparatus includes a variable gain amplifier which has its gain adjusted in accordance with the amplitude of a limit cycle to maintain close following between the model output and aircraft response and also to prevent instability.

In order to clarify the method herein which involves a plurality of various bending frequencies, a first step involves the method to achieve positive control of one bending mode of the craft. The application of the control of one craft bending mode will thereafter be extended to define the required configuration to define a control system capable of controlling not only the rigid body motion but also a multiple number or plurality of craft bending modes as well. However, before describing the apparatus, a general summary will be made of the methods or principles to be applied.

Methods of control and the capabilities of controllers to exercise positive control of rigid body and elastic modes of flexible aircraft depend, to a great extent, upon the quantities which are measured by the sensor complement. One old technique is to use single sensors placed at proper positions on the aircraft to give proper feedback to the controller. However, this method does not represent a satisfactory solution in many cases. It may not be possible to place the sensor in a desirable location from a practical design consideration standpoint. Even though a favorable location may be found, and it is possible to place the sensor there, the controller may not be capable of producing satisfactory overall responses. This may occur since the relative contributions of the elastic modes to the sensor signal are determined by the relative shapes of the normalized mode deflections. Other methods need to be developed.

To overcome the difficulties that arise when only a single sensor is used, a method involving the use of multiple sensors is proposed. The objectives of such an effort are to obtain a system which places less stringent requirements on sensor location and enhances the capability of exercising direct control of individual modes and rigid body motion.

Figure 6:
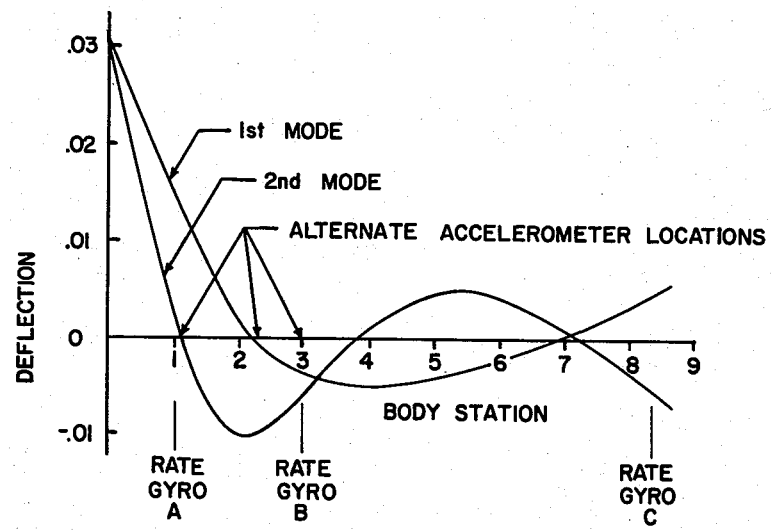
FIGURE 6 is a graph of bending mode shapes for a typical elastic body vehicle showing typical sensor locations for control of two vehicle bending modes.

The method has developed techniques for "blending" the outputs from a number of similar sensors on the craft to obtain separate signals corresponding respectively and substantially to the rigid body motion and motions or deflections of a point or station due to the elastic modes of flexible aircraft. The fact that these signals may be obtained independently and separately will allow greater flexibility in the design of the control system for the craft. The blending techniques will now be discussed using the following nomenclature generally used in considering aerolasticity of a craft to describe the deflection of a point due to rigid body rate and various vibration modes:

$\theta$—rigid body pitch rate
$q_j$—modal amplitude function for $j$th bending mode
$\dot{q}_j$—modal amplitude function rate for the $j$th bending mode
$\lambda_j{}^i$—normalized slope of $j$th bending mode at $i$th sensor location for a given slope at the sensor for a given deflection at a selected point
$\theta_i$—rate gyro signal at $i$th sensor location
$K_i$—blender position for $i$th gyro blender
$K\theta$—rigid body rate feedback gain
$K_{\dot{q}1}$—first bending mode feedback gain
$K_{\dot{q}2}$—second bending mode feedback gain
$\delta_{ec}$—commended aircraft surface deflection
$T$—filter time constant
$K_c$—adaptive control system controller gain
$N_x$—normal acceleration at accelerometer station Initially, the body bending mode shapes are assumed known, see FIGURE 6, and it is desired that the first N elastic modes of the craft are to be controlled. Then to obtain the aircraft rigid body angular rate, $\theta$, and bending rate $\dot{q}_i$ for $i=1, 2, \ldots$ N finite body bending frequencies to be controlled would require $N+1$ rate sensors at corresponding stations. Rate gyros placed at $N+1$ fuselage stations will have outputs due to craft rigid body motion about the axis involved and due to the body bending motion at all bending modes or frequencies thus: for station $i$, (1) $\dot{\theta}_i = \dot{\theta} + \sum_{j=1}^{N} \lambda_j{}^i \dot{q}_i{}^i +$ (higher frequency terms)

Where
$$i=1, 2, \ldots N+1$$
wherein $\lambda$ is the normalized slope at the station for the particular frequency and $\dot{q}$ is the normalized rate of bending deflection affecting a sensor placed at that station.

The higher frequency terms are the contributions of the elastic modes not being controlled ($N+2$, $N+3$, ...). Now suppose the higher frequency terms were not present. If the matrix of coefficients of $\theta, \dot{q}_1, \ldots \dot{q}_N$ in (1) is nonsingular, i.e., the $N+1$ equations (1) are linearly independent, then (1) gives $N+1$ linear algebraic equations which may be used to determine $\theta, \dot{q}_1, \ldots \dot{q}_N$. With the mode shapes known, it is not unreasonable to expect that locations for the sensors can be chosen to ensure the nonsingularity of the matrix above mentioned. In a singular matrix the determinant of the coefficients is zero. For a nonsingular matrix this determinant is not zero as is well known.

In the practical case the higher frequency terms or effects on the sensors can be suppressed sufficiently by the use of a low-pass filter to be of little concern. It is clear that similar results can be obtained for angular acceleration sensors instead of angular rate sensors. Linear accelerometer output signals, sensing accelerations in direction of the craft Z axis, could also be combined to give modal components of stiffening feedbacks. Thus, for the ideal situation, it is possible to obtain pure mode signals from mixed signals.

In practice, however, the bending mode shapes are not known exactly and are not constant over the entire flight envelope of an aircraft for example. Two possibilities occur: the overall aircraft control system is tolerant to such variations without requiring any modification, or an adaptive capability needs to be included in the control system to overcome the uncertainties and changing environment of the craft. An analysis will determine the tolerance of the system. If an adaptive capability is required, blending techniques may be used.

Before describing the adaptive blending techniques, it is profitable to consider the ideal case further. Upon solving the system of equations (1) for $\theta, \dot{q}_1, \ldots \dot{q}_N$, as defined, it is found that each is a linear combination of the sensor signals $\theta_i, i=1, 2, \ldots N+1$. Thus, each of these signals can be obtained by summing the outputs of the $N+1$ gyros, each output being multiplied by an appropriate gain (this gain being only a function of mode shapes for a given set of gyro locations). These signals being used for control are multiplied by controller gains and hence any variations in bending modal data may be thought of as only causing variations in the controller gains.

Figure 2:
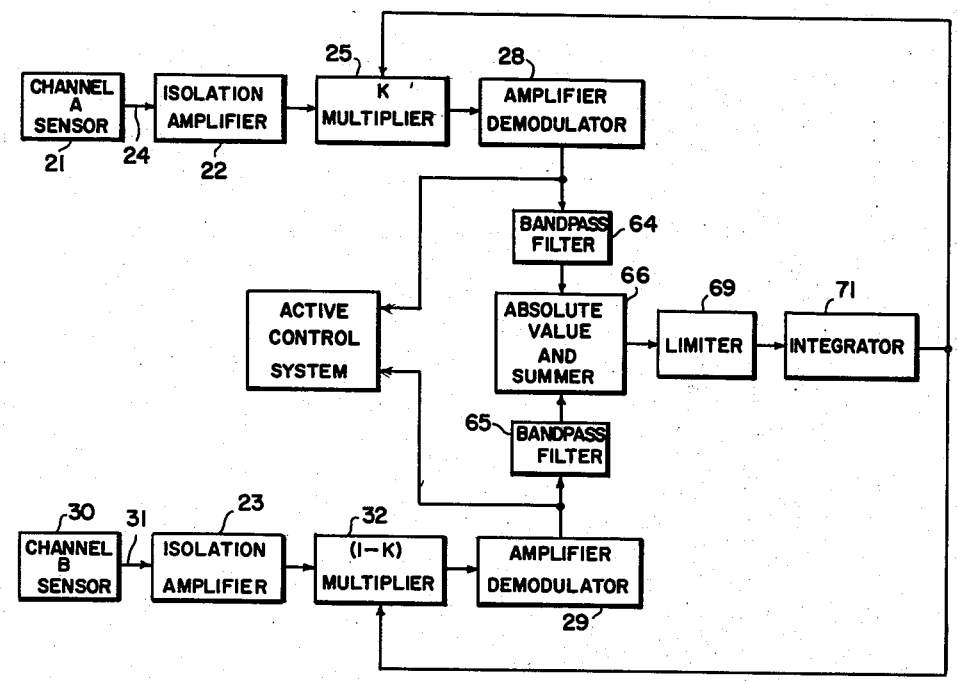
FIGURE 2 is a block diagram of a blender logic for isolating a particular craft body bending frequency effect.
Figure 3:
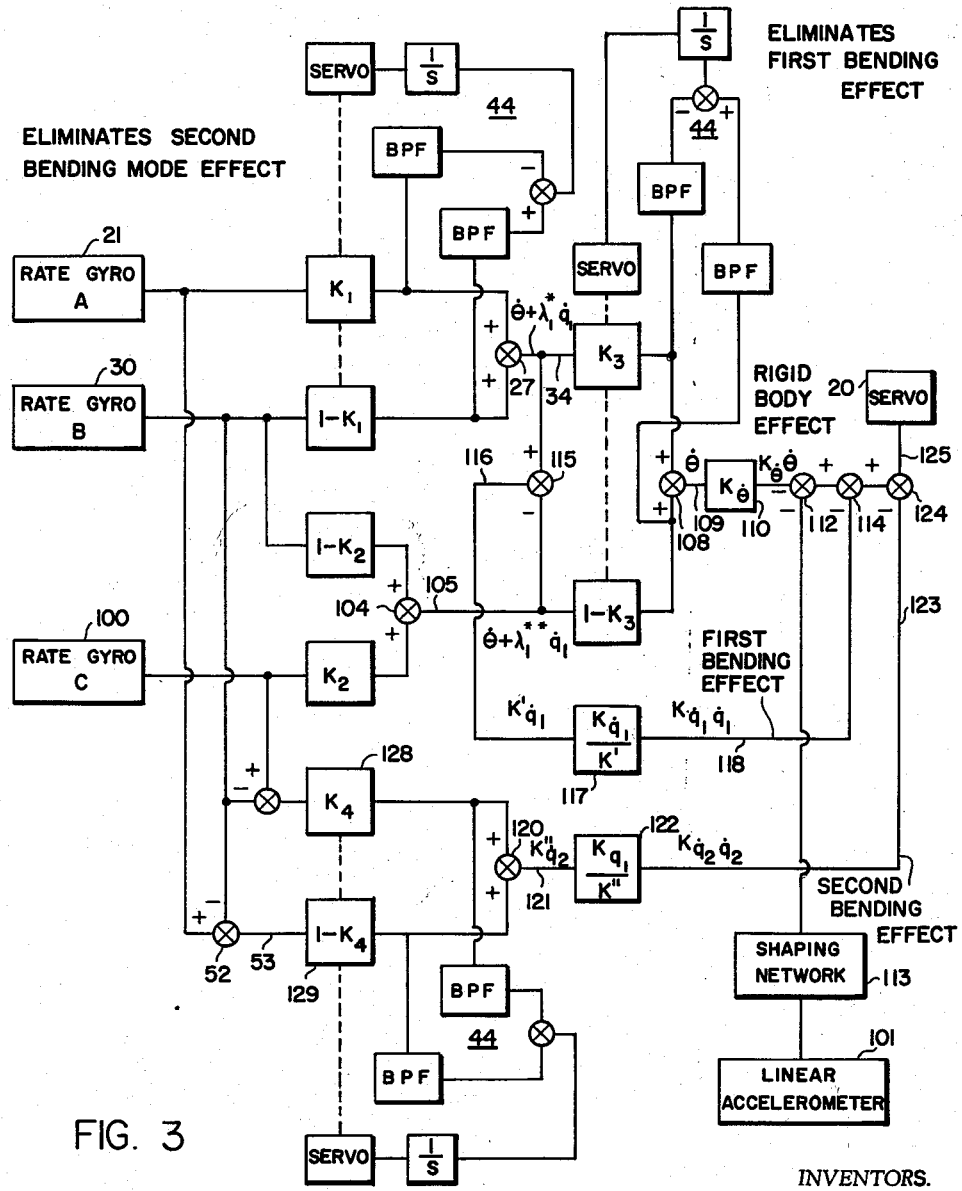
FIGURE 3 is a block diagram of an overall gust alleviation and bending mode controlling for two modes or frequencies of an aerolastic craft.

The simplified block diagram shown in FIGURE 3 herein which is similar to FIGURE 2 of Falkner et al. will help to clarify the previous statement.

To add an adaptive capability to the control system to ensure tolerance to variations in modal bending data, two approaches may be taken. One is to adjust the control system controller gains adaptively (in FIGURE 3: $K_\theta, K_{\dot{q}1}, K_{\dot{q}2}$). The other is to adjust the gains involved in the summing of the outputs of the sensors (in FIGURE 3: $K_1, K_2, K_3, K_4$). The first approach may appear worthy of further investigation since there are not as many gains to be adjusted (for FIGURE 3, the first approach involves adjusting the three gains $K_\theta, K_{\dot{q}1}, K_{\dot{q}2}$ whereas the second approach requires the adjustment of the four gains $K_1, K_2, K_3$ and $K_4$). However, the relationship of the variations in the controller gains to variations in modal data is quite complicated. Although the second approach involves the adjustment of more gains, the logic for making the adjustments is more straightforward. This second approach is compatible with the use of blending techniques developed herein.

Figure 5:
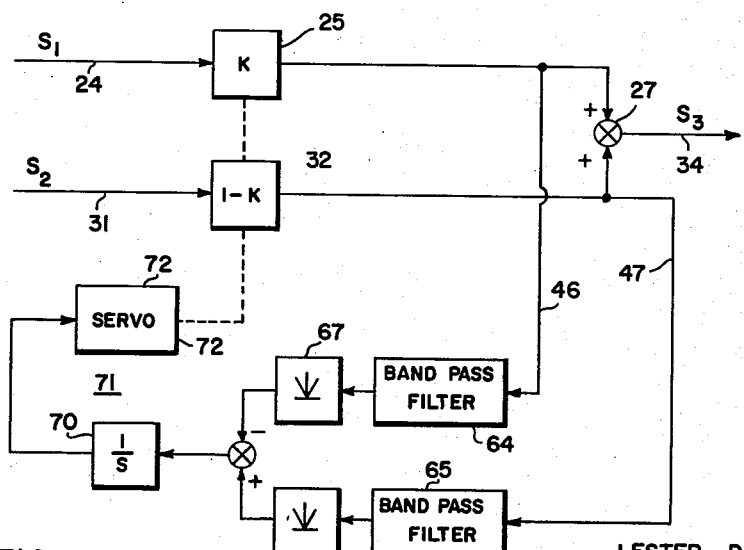
FIGURE 5 is a block diagram of a blender logic.

The blending technique previously referred to and disclosed in the Falkner et al. application is the technique of automatically blending two signals containing contributions from a particular body bending mode so that the output of the blender is free of any contribution from this bending mode. The distinction thereover in the present invention will be clarified hereinafter. FIGURE 5 is a block diagram of a signal blender with inputs $S_1$ and $S_2$ and output $S_3$. For example, $S_1$ and $S_2$ might be $\theta_1$ and $\theta_2$, and the $p^{th}$ bending mode is to be eliminated from $S_3$. Then $\lambda_p^1 \lambda_p^2$ must be negative and the band-pass filters are centered at the $p^{th}$ mode frequency. From FIGURE 5:

$$S_3 = KS_1 + (1-K)S_2 = \theta + \sum_{i=1}^{N} [K\lambda_i^1 + (1-K)\lambda_i^2] q_i$$

The blender logic then drives K until $$K\lambda_p^1 + (1-K)\lambda_p^2 = 0$$

i.e. $\dot{q}_p$ for the $p^{th}$ bending mode frequency is cancelled or makes no contribution to blender output $S_3$. The only restriction on the signals to be blended is that the slopes at the sensors $\lambda_p^1 \lambda_p^2 < 0$. For the cases with $N < 3$ this is a rather mild restriction on the positioning of the gyros. For $N \geq 3$, the restrictions imposed on the locations of the sensors are not expected to be too severe.

Returning to the control of one bending mode, there is shown in FIGURE 1, a control system applied to the pitch axis of an aircraft, as an example, for this purpose. The invention herein has been applied to an adaptive type control system similar to that shown in FIGURE 3 of the aforesaid Falkner et al. application but the essential difference over the prior application is that of not only separating but also measuring both the effects due to the craft rigid body motion and the effects due to one bending mode and providing positive control of such bending mode. The adaptive system utilizes a source of command signal such as pilot command 10 having its signal supplied from over transmission means 11 to a model 12 in turn having its output 13 supplied to a first summing device 14. The output from summing device 14 is supplied over transmission means 15 to a second summing device 16 which through the transmission means 17 controls a variable gain amplifier 18 having a transfer function $K_c$. The amplifier 18 through transmission means 19 controls the operation of a servomotor 20 that operates the pitch attitude control surface of the craft (not shown).

Since but one bending mode is being controlled, the craft is also provided with a forward pitch rate gyroscope 21, having its output supplied via transmission means 24 and gain device 24, transmission means 26 to a third summing device 27. An aft pitch rate gyro 30 has its output supplied via transmission means 31, gain device 32 having a transfer function $1-K$ and thence through transmission means 33 to summing device 27. The output of summing device 27 which is the rigid body pitch rate of the craft is supplied through one network 35 to first summing device 14. The output from device 27 is supplied to a fourth summing device 40 in turn having its output supplied as an input to the second differential or summing device 16.

Figure 4:
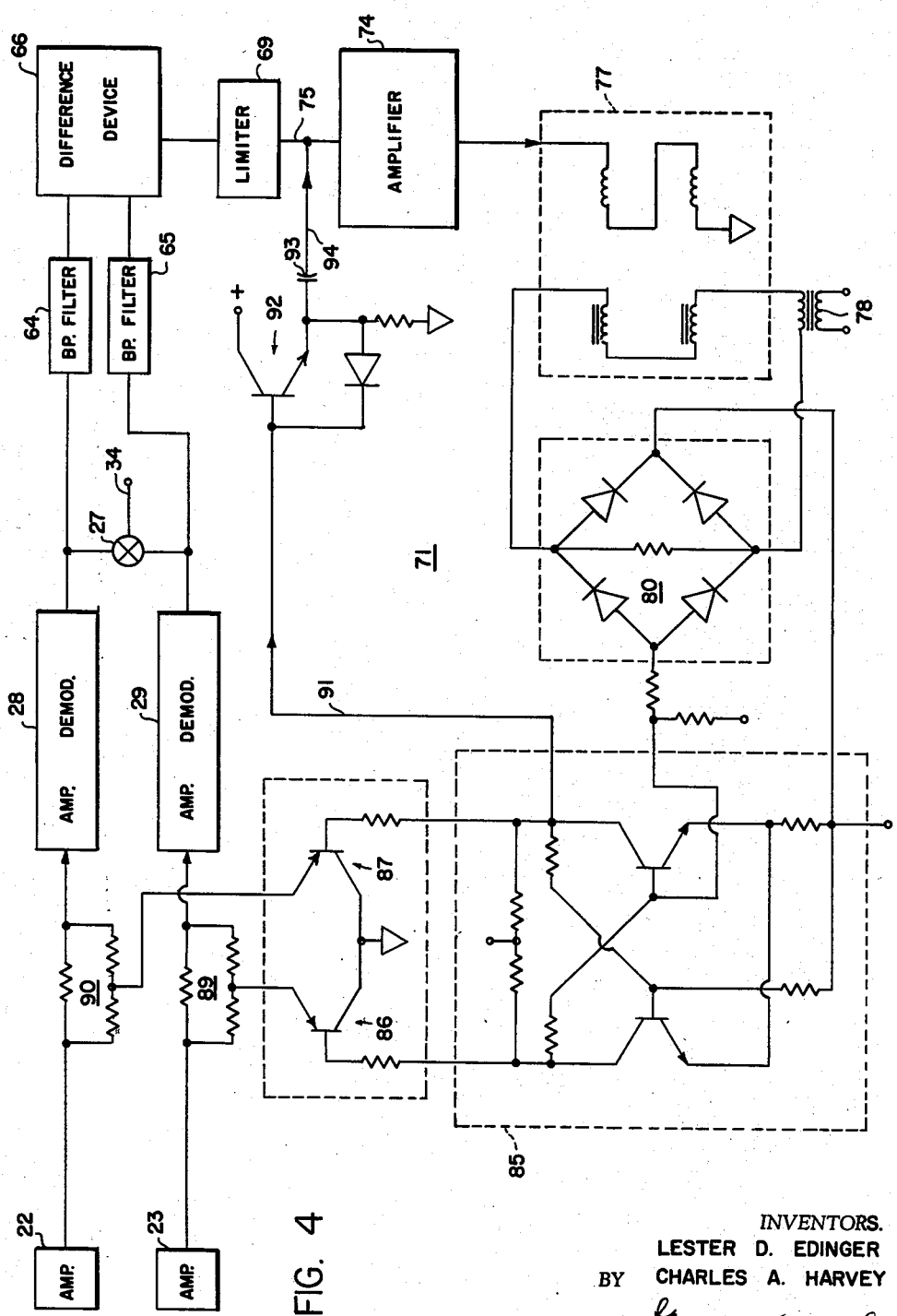
FIGURE 4 is an electrical schematic of a craft motion sensor blender and multipliers.

The gain or transfer function of devices 25, 32 is controlled by a rate gyro blender 44 which includes a blender logic 45 shown schematically in FIGURE 2 and more fully illustrated in FIGURE 4. As illustrated in FIGURES 2 and 4 the multipliers K and (1-K) are adjusted from an integrator. The arrangement is such that a selected bending frequency is cancelled so that the output on transmission means 34 includes the rigid body motion and small body bending effects other than the cancelled body bending frequency effect.

The output from the forward pitch rate gyro 21 is supplied through transmission means 50 to a summing means 52 which also receives the signal from the aft pitch rate gyro through transmission means 51. The difference between the signals on summing means 52 as indicated by the mathematical signs is supplied through the transmission means 53 to provide the selected mode or first bending mode rate signal separate from the rigid body motion signal and higher body bending frequency signals. The signal on transmission means 53 is supplied through gain device 54 and over transmission means 55 to a sixth signal summer 61 which also receives the output of a linear accelerometer 57 sensing accelerations in the direction of the craft Z axis. The output of accelerometer 57 is supplied to shaping network 58 such as a lag network and transmission means 60 to the summer 61.

It will be evident from FIGURE 1 that there is obtained on transmission means 53 a signal due solely to the first bending mode of the flexible craft since the rigid body effects cancel and that this separate signal may be weighted by gain device 54 before being supplied through summing device 61, transmission means 62 to summing device 40 and thence through transmission means 41 to summing device 16 forming part of the control system. It is also evident that the signal on transmission means 34 excludes the effect due to the first bending mode but includes the rigid body motion effect such as the angular pitch rate.

FIGURE 2 shows the blender block diagram where the rate gyro sensors provide A.C. control signals. In such arrangement signals from rate gyro 21 which are of the alternating type which vary in magnitude and phase in accordance with the magnitude of the craft pitch rate and a phase varying with the direction of the craft angular rate are supplied over transmission means 24 to an isolation amplifier 22 having its output supplied through multiplier 25 to an amplifier-demodulator 28 which converts the A.C. signal having the output free of the frequency of the carrier voltage supplied to sensor 21. The output of amplifier demodulator 28 is therefore low frequency signals comparatively, and the band pass filter 64 passes only, in this case, a selected bending mode frequency to an absolute value and summer 66.

Similarly, the alternating signal from sensor 30 through transmission means 31 and isolation amplifier 23 supplies a signal as modified by multiplier 32 to a second amplifier-demodulator 29 having its output supplied through band pass filter 65 transmitting only the selected craft bending mode frequency to summer 66. The signals from band pass filters 64, 65 are converted to their absolute values and their difference is obtained in device 66 and thence transmitted through limiter 69 to an integrator device 71 comprising an integrator and a motor which adjusts the gains of multipliers 25, 32.

FIGURE 5 shows the rate gyro blender in simplified form wherein the integrator device 71 of FIGURE 2 is shown as having the integrator 70 and the servo 72 controlled thereby where the servo 72 adjusts the gain devices 25 and 32.

FIGURE 4 shows the details of the blender integrator and multipliers in electrical schematic form associated with the remaining elements of the blender block diagram of FIGURE 2. The integrator device 71 therein comprises a transistorized amplifier 74 which receives over transmission means 75 the output from limiter 69 and in turn controlling a saturable reactor or magnetic amplifier 77 which receives power from the reference transformer 78. The saturable reactor 77 in turn controls a full wave bridge 80 to provide pulse width modulation control of a flip-flop arrangement 85 operating through transistorized switches 86, 87 which respectively control attenuators 89, 90 arranged between isolation amplifier 22 and amplifier-demodulator 28; and amplifier 23 and amplifier-demodulator 29, respectively. Attenuator 89 is related to the 1−K function and attenuator 90 is associated with the K function of the blender. The integration is effected by connecting the flip-flop 85 through a feedback conductor 91, transistor 92, high pass capacitor 93, conductor 94 to the input of amplifier 74.

In FIGURE 3 there is provided a gust alleviation and mode controller for the rigid body and two body bending modes of the aircraft. The object of the arrangement is to obtain separately the effect or signal due to the rigid body motion, the effect due to the first body bending action, and the effect due to the second body bending action. In FIGURE 3 there is provided again the rate gyro 21 in a channel A and a rate gyro 30 in a channel B which through a rate gyro blender 44 provides from summing device 27, an output $\theta + \lambda_1 \dot{q}_1 = \theta + [K_1 \lambda_1{}^A + \lambda_1{}^B (1 - K_1)] \dot{q}_1$ comprising the rigid body and first bending mode effects.

Also there is obtained through rate gyro 30 and a third rate gyro 100 in a channel C, signals which are associated with a blender for gain devices $K_2$ and $(1-K_2)$ to provide an output like that on output 34 of differential 27 i.e. an output 105 from a differential 104 wherein the second body bending effect has been cancelled or eliminated. Further, through gain device $K_3$ receiving the input from transmission means 34 and a second gain device $(1-K_3)$ receiving its input from transmission means 105 and providing another rate gyro blender 44 for the gain devices $K_3$ and $(1-K_3)$ which blender eliminates the first body bending effect there is provided as an output from summing device 108 through transmission means 109 a second signal identified as $\theta$ which is the rigid body rate with the second and first body bending effects eliminated. Transmission means 109 which carries the rigid body rate supplies a gain device 110 which has its output supplied to a summing arrangement 112.

The summing device 112 also receives signals, reinforcing that from device 110, supplied from a shaping lag network 113 which may be of the resistor-capacitor type and derived from a linear accelerometer 101 supplying a D.C. signal voltage in accordance with the linear normal acceleration of the craft along the craft Z axis. The output from summing device 112 is supplied to summing device 114. The two signals on transmission means 34 and 105 which have had eliminated therefrom the effect due to the second body bending action of the craft are connected in opposing or subtractive relation to summing arrangement 115 whereby the output therefrom is the effect or signal due solely to the first body bending action of the craft. This signal is supplied through gain device 117 and transmission means 118 to summing device 114 in opposing relation to that from summer 112.

Going back, the output of rate gyro 21 and the output of rate gyro 30 is supplied in subtractive relation to summing device 52 whereby the output on transmission means 53 is the effect due primarily to the first and second craft body bending actions since the rigid body effect is cancelled. Similarly the output from rate gyro B and the output from rate gyro C is supplied to summing arrangement 116 in opposing relationship so that the output 117 of summing device 116 also contains a signal or effect due primarily to the first and second craft body bending action. By means of an additional rate gyro blender 44 comprising the gain devices 128, 129 there is supplied to differential 120 an effect due solely to the second craft body bending action, the effect due to the first body bend-action having been eliminated by the additional rate gyro blender 44. The output from summing arrangement 120 is supplied through conductor or transmission means 121 to gain device 122. Device 122 in turn supplies its output through transmission means 123 to summing device 124 in opposition to the output from summer 114.

Repeating, it will be seen that the outputs from summing arrangement 114 is opposed to the signal on transmission means 123 in summing arrangement 124 and that the output therefrom appearing on transmission means 125 is utilized to control the servomotor 20. Such control may be effected by applying the signal on transmission means 125 to the adaptive control system variable gain amplifier such as amplifier 18 FIGURE 1 which results in operation of an elevator control surface to damp the rigid body motion and the first and second body bending modes of the craft.

It will now be apparent that there has been provided a method and apparatus whereby for an aerolastic type craft there may be obtained the rigid body response of the craft to a disturbance along with a plurality of separate signals representing the higher body bending actions of the craft that it is desired to damp or control. While changes could be made in the above apparatus and while different embodiments of the invention could be made without departing from the scope thereof, it is intended that the above description taken with the accompanying drawings shall be construed as illustrative and not in a limiting sense of the invention.

What is claimed is:

1. In an aerolastic type dirigible craft subject to body bending at a plurality of bending frequencies about an axis while in linear travel at an angle to said axis and having a control surface for moving the craft about said axis and servo means operating said surface, a plurality of craft flight condition sensors spaced along an axis of the craft in the direction of craft travel each sensor responsive to the flight condition and to the craft bending frequencies, the number of sensors exceeding by one the number of body bending frequencies to be controlled; means operated by each sensor developing a variable signal in response to craft motion about said axis due to either the change in condition or the bending of the craft, signal blending means responsive to all of said signals, and providing a plurality of separate signals due to a plurality of separate bending frequencies and a signal due to the change in condition; and means controlling said servo means from said plurality of separate signal frequencies and the change in craft condition.

2. In control apparatus for a flexible type dirigible craft subject to change from a predetermined position while in linear travel, similar sensing means positioned along the craft and responsive to the change in position of the craft and also responsive to the flexing action of the craft for a plurality of bending modes or bending frequencies; means for pairing said plural sensing means; means deriving therefrom separately the effects due to craft change in position and the effects due to the plurality of bending modes of the craft.

3. In an adaptive type control apparatus for an aircraft of the aerolastic type subject to change from a predetermined position while in flight, a plurality of sensing means positioned along the craft and responsive to both the change in craft position and also to the flexing action of the aerolastic craft for a plurality of body bending modes or bending frequencies, the number of sensing means being one greater than the number of body bending frequencies to be considered; means for pairing said plurality of sensing means; and means deriving therefrom separately the effects due to craft change in position and the effects due to a plurality of body bending modes of the craft.

4. The apparatus of claim 3, and gain devices for weighting the effects due to the body bending effects of the craft.

5. In an adaptive type automatic control system for an aerolastic aircraft, said system having a gain changer for controlling the magnitude of residual oscillations of a servomotor in said system, at least two rate gyroscopes spaced in the direction of the longitudinal axis of the aircraft and responsive to the angular rate of the craft about an axis and a bending mode of the craft; rate gyro blender means connected to said two gyroscopes and supplying an output due solely to the rigid body angular rate of the craft wherein said body bending mode is eliminated; further means connected to said two gyroscopes and eliminating the rigid body angular rate of the craft to obtain the effect due to the said body bending action; and means combining the effect due to the rigid body motion and the effect due to the body bending action and controlling said servo means.

6. In control apparatus for an aircraft having a control surface for changing attitude thereof about an axis; two sensing devices positioned along the craft in the direction of an axis at right angles to the control axis of the surface, said sensing means being responsive to craft change in position about the control axis and effects due to the flexing of the craft; blender means connected to said sensing means and providing an output from which the craft flexing has been eliminated; means connected to the sensing means and providing an output from which the change in position of the aircraft rigid body has been eliminated; gain changing means responsive to the two separate signals and controlling servo means operating said surface.

7. In steering control apparatus for a dirigible vehicle having steering means thereon, in combination: a pair of sensing means spaced along the vehicle substantially in the direction of travel thereof; signal blender means responsive to said two signal means and providing an output signal free from a body bending action of the vehicle; further means connected to the two sensing means in parallel with said blender and obtaining an output signal due to the body bending effect; a pair of gain devices one for each signal; and means connected to the two gain devices and controlling the craft steering apparatus therefrom.

8. In control apparatus for a flexible type dirigible vehicle having steering means for moving the vehicle relative to the direction of travel of the vehicle and having control means for said steering means, said control apparatus including a first craft position signal providing sensing means; a second craft condition signal providing sensing means, both said sensing means being spaced on the vehicle in a direction of an axis thereof; blender means connected to said two sensing means and providing an output due to the change in craft condition; further means connected to the two sensing means and supplying an output signal free of the change in craft condition; means for modifying said two signals; and means combining the output of said modifying means.

9. In an aerolastic type aircraft having steering means for moving the craft on an axis at an angle to the direction of travel of the craft, a pair of similar signals providing sensing means spaced along a direction at an angle to said axis and both detecting a change in a flight condition of the craft to be controlled by the steering means and both detecting an effect due to the flexing of the craft during the change in said condition; means connected to the two sensing means and combining their signals in opposition to obtain a signal due only to the flexing of the craft; and means controlling the steering means from said resultant signal.

10. The apparatus of claim 9, further means controlled by the sensing means including signal blending means and providing an output signal dependent on the change in craft flight condition and free from the effect due to the craft flexing; and means for further controlling said steering means from said additional signal.

11. In automatic steering apparatus for an aircraft having position changing means operated by the steering means, a gyroscope arrangement for providing an effect due to flexing of the craft comprising a first and a second rate gyroscope spaced along the craft in the direction of an axis thereof, each gyroscope being responsive to a change in the flight condition of the craft and body bending action of the craft; means for combining the output signals of said two rate gyroscopes to eliminate the effect due to the change in flight condition; and servo means in said automatic steering means responsive to said resultant signal to damp the body bending action of the craft.

12. The method of damping the amplitudes of a plurality of elastic modes of a flexible aircraft comprising: sensing the change in position of a craft and the bending thereof at a plurality of stations exceeding by one the significant bending or elastic modes of the craft; combining the signals representing the deflections of the various elastic modes sensed at the various stations and obtaining separately therefrom a signal representing a separate bending frequency; and combining the separate signals from a plurality of different stations and positioning attitude controlling means of the craft therefrom.

References Cited in the file of this patent
UNITED STATES PATENTS
2,832,551     Gille _____ Apr. 29, 1958